(12) United States Patent  
Cha et al.

(10) Patent No.: US 12,553,852 B2
(45) Date of Patent: Feb. 17, 2026

(54) PHOTOCURABLE REAGENT(S) FOR FORMING CHLORIDE ION-SELECTIVE SENSOR(S) AND METHODS OF PRODUCTION AND USE THEREOF

(71) Applicant: Siemens Healthcare Diagnostics Inc., Tarrytown, NY (US)

(72) Inventors: Kyoung Ha Cha, Wilmington, DE (US); Zhu Teng, Garnet Valley, PA (US); Si Yang, Garnet Valley, PA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 500 days.

(21) Appl. No.: 17/755,390

(22) PCT Filed: Oct. 30, 2020

(86) PCT No.: PCT/US2020/058206  
§ 371 (c)(1),  
(2) Date: Apr. 28, 2022

(87) PCT Pub. No.: WO2021/118706  
PCT Pub. Date: Jun. 17, 2021

(65) Prior Publication Data  
US 2022/0373500 A1 Nov. 24, 2022

Related U.S. Application Data

(60) Provisional application No. 62/946,499, filed on Dec. 11, 2019.

(51) Int. Cl.  
*G01N 27/333* (2006.01)  
*C08G 59/06* (2006.01)  
(Continued)

(52) U.S. Cl.  
CPC ......... *G01N 27/3335* (2013.01); *C08G 59/06* (2013.01); *C08G 59/502* (2013.01);  
(Continued)

(58) Field of Classification Search  
CPC .. G01N 27/3335; C08G 59/06; C08G 59/502; C08G 59/04; C08J 7/123; C08J 2363/00; C08K 5/07  
See application file for complete search history.

(56) References Cited

U.S. PATENT DOCUMENTS 4,798,664 A * 1/1989 Yamaguchi ........ G01N 27/3335  
204/418  
7,384,523 B2 6/2008 Samproni  
(Continued)

FOREIGN PATENT DOCUMENTS

| CN | 105408104 | 3/2016 |
|---|---|---|
| CN | 107835940 | 3/2018 |

(Continued)

OTHER PUBLICATIONS

Bratov et al., Investigation of chloride sensitive ISFETs with different membrane compositions suitable for medical applications, Analytica Chimica Acta, 2004, 514, 99-106 (Year: 2004).*

(Continued)

*Primary Examiner* — Shizhi Qian

(57) ABSTRACT

Improved formulation(s), device(s), and method(s) for producing ion-selective electrodes (ISEs) that comprise at least one photo-curable, epoxy-based, ion-selective chloride membrane(s) compounds that can be pre-mixed together to form a singularly-dispensed mixture for the formation of an ion-exchange resin membrane(s) for incorporation and use in a chloride ISE.

14 Claims, 4 Drawing Sheets

Epoxy Resin (DER 332)

Epoxy Resin (DER 331)

$N^1, N^1, N^6, N^6$-tetraallylhexane-1,6-diamine (BF1)

Polypropylenimine Tetramine Dendrimer (DAB)

2,2-Dimethoxy-2-phenylacetophenone (DMPA)

(51) Int. Cl.
   *C08G 59/50* (2006.01)
   *C08J 7/12* (2006.01)
   *C08K 5/07* (2006.01)

(52) U.S. Cl.
   CPC .............. *C08J 7/123* (2013.01); *C08K 5/07* (2013.01); *C08J 2363/00* (2013.01)

(56) References Cited

U.S. PATENT DOCUMENTS

| | | | | |
|---|---|---|---|---|
| 2005/0006253 | A1* | 1/2005 | Samproni | G01N 27/3335 205/778.5 |
| 2005/0241958 | A1 | 11/2005 | Shin | |
| 2007/0218295 | A1* | 9/2007 | Bateman | C09D 5/002 428/411.1 |
| 2012/0077903 | A1 | 3/2012 | Yamagami et al. | |
| 2016/0223486 | A1* | 8/2016 | Ishige | G01N 27/3335 |
| 2018/0031520 | A1* | 2/2018 | Tedesco | G01N 27/4145 |
| 2018/0143156 | A1* | 5/2018 | Peng | G01N 27/3335 |
| 2018/0321175 | A1 | 11/2018 | Lauks et al. | |
| 2022/0187235 | A1* | 6/2022 | Watanabe | G01N 27/413 |

FOREIGN PATENT DOCUMENTS

| | | |
|---|---|---|
| CN | 108593745 | 9/2018 |
| JP | S62163960 | 7/1987 |
| JP | H3-033649 | 2/1991 |
| JP | 2003-521248 | 7/2003 |
| JP | 2003215087 | 7/2003 |
| JP | 2007-513320 | 5/2007 |
| JP | 2007-535678 | 12/2007 |
| JP | 2008-256725 | 10/2008 |
| JP | 2019-514351 | 6/2019 |
| KR | 2004003429 | 9/2005 |
| WO | 2016187174 | 11/2016 |

OTHER PUBLICATIONS

Lee et al., Ion-sensitive FET for biological sensing, Sensors, 2009, 9, 7111-7131 (Year: 2009).*

Alva et al., Screen-printed potassium ion sensor fabricated from photocurable and self-plasticized acrylic film, Journal of Physical Science, 2006, 17, 141-150 (Year: 2006).*

Ortiz et al., The development of an epoxy-amine/thiol-ene photocurable system, J. Polymer Research, 2014, 21, 504 (Year: 2014).*

Lei, Ming et al; "Preparation of chlorine ion sensor"; China Academic Journal Electronic Publishing House; 41:15, pp. 78-81, (2018), English Abstract.

Bratov A et al: "Photocurable Polymer Matrices for Potassium-Sensitive Ion-Selectiveelectrode Membranes", Analytical Chemistry, American Chemical Society, US, vol. 67, No. 19, Oct. 1, 1995 (Oct. 1, 1995), pp. 3589-3595,.

Shin et al., "Characterization of Epoxy Resin-Based Anion-Responsive Polymers: Applicability to Chloride Sensing in Physiological Samples", Anal. Chem., (2004), v.76, No. 14, 4217-4222.

International Search Report for PCT/US2020/058206 dated Jan. 7, 2021.

* cited by examiner

PHOTOCURABLE REAGENT(S) FOR FORMING CHLORIDE ION-SELECTIVE SENSOR(S) AND METHODS OF PRODUCTION AND USE THEREOF

CROSS REFERENCE TO RELATED APPLICATIONS

Not Applicable.

STATEMENT REGARDING FEDERALLY FUNDED RESEARCH OR DEVELOPMENT

Not Applicable.

BACKGROUND

The use of ion selective electrodes (ISEs) to determine the presence and quantity of various analytes in biological samples has become a useful diagnostic technique. For instance, ISEs have been used to detect, by way of example only, analytes such as magnesium, fluoride, sodium, potassium, calcium, and chloride ions. Some of these ISEs are often housed within clinical diagnostic instruments for simultaneous analysis of a large number of analytes.

ISEs typically comprise at least one ion-selective membrane being constructed of: (1) glass membrane(s) (such as, by way of example, membrane(s) comprising silicate or chalcogenide); (2) crystalline membrane(s) (such as, by way of example, membrane(s) comprising mono- or poly-crystallites of a single substance, such as the use of lanthanum fluoride ($LaF_3$) crystals for the detection of fluoride ions); and/or (3) ion-exchange resin membrane(s).

Ion-exchange resin membranes are based on special organic polymer membranes which contain at least one specific ion-exchange substance (resin). The utilization of specific resins allows for the preparation of selective electrodes that detect a wide array of both single-atom and multi-atom ions.

One such use of the ISEs is for the determination of the amount of chloride ions in a biological sample, specifically blood. The fabrication of ion-exchange resin membranes commonly known in the art involve the mixing of at least two components to form the resin membrane. In one non-limiting embodiment, that at least two components forming the ion-exchange resin membrane may comprise at least one resin material, such as resin paste, and at least one hardener material, such as a hardener paste. Because the mixing of the at least one resin material and the at least one hardener may yield a short curing time (i.e., less than about five (5) minutes), it may not be ideal to use the separate materials that cannot be pre-mixed and that require at least two separate dispensers to dispense and mix the materials on a substrate, which may increase the production costs of the resin membrane(s) and ISEs.

Accordingly, there is a need for improved formulation(s), device(s), and method(s) for producing ISEs that comprise at least one photo-curable, epoxy-based, ion-selective chloride membrane(s) compounds that can be pre-mixed together to form a singularly-dispensed mixture for the formation of an ion-exchange resin membrane(s) for incorporation and use in a chloride ISE. It is to such formulation(s), device(s), and method(s) that such presently disclosed and/or claimed inventive concept(s) is/are directed.

DETAILED DESCRIPTION

Figure 1:
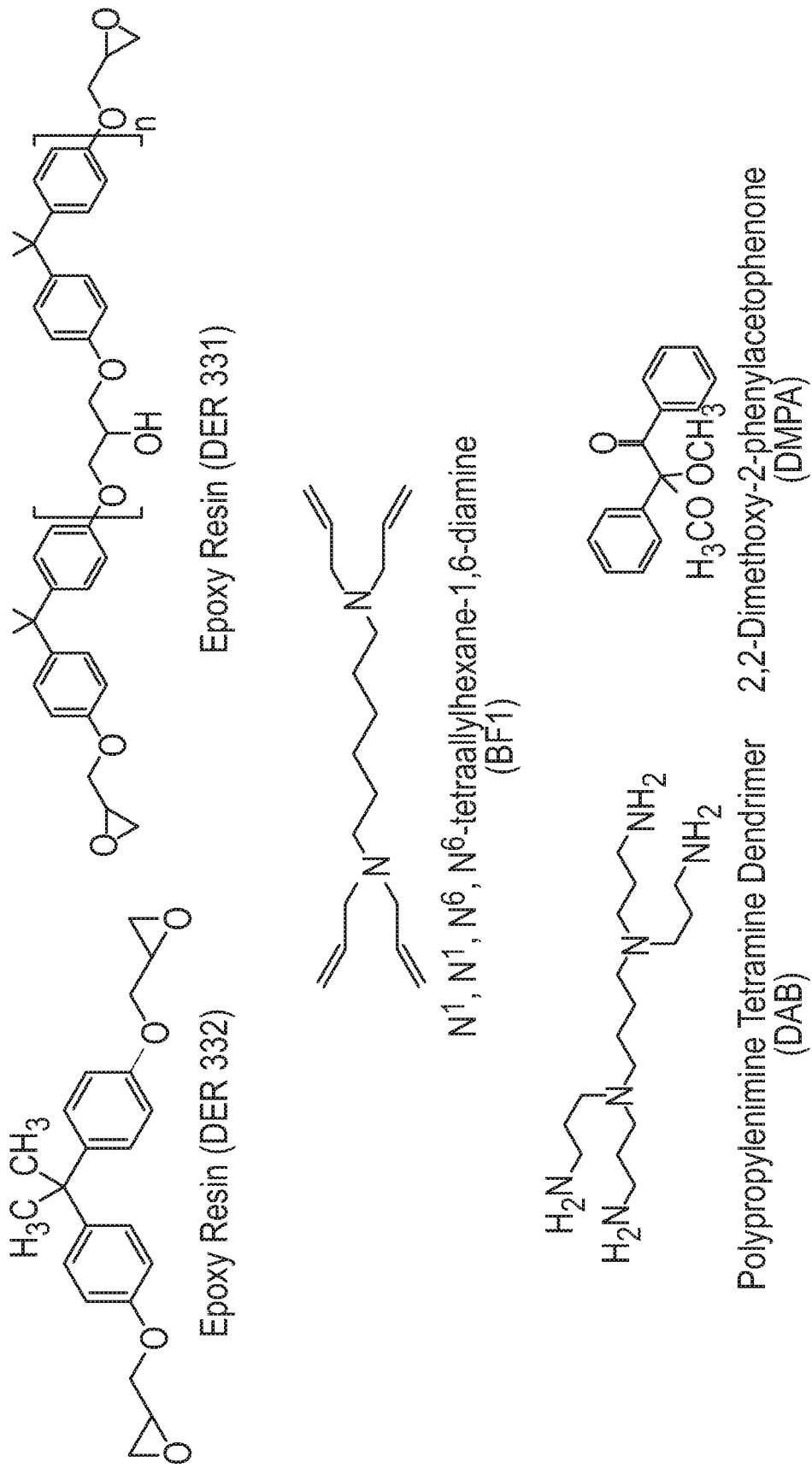
FIG. 1 illustrates a non-limiting embodiment of reagents utilized for the creation of a photo-curable, epoxy-based, ion selective chloride membrane for use in a chloride ion-selective sensor in accordance with the presently disclosed and/or claimed inventive concept(s).

Before explaining at least one embodiment of the inventive concept(s) in detail by way of exemplary drawings, experimentation, results, and laboratory procedures, it is to be understood that the inventive concept(s) is not limited in its application to the details of construction and the arrangement of the components set forth in the following description or illustrated in the drawings, experimentation and/or results. The inventive concept(s) is capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Unless otherwise defined herein, scientific and technical terms used in connection with the presently disclosed and/or claimed inventive concept(s) shall have the meanings that are commonly understood by those of ordinary skill in the art. Further, unless otherwise required by context, singular terms shall include pluralities and plural terms shall include the singular. Enzymatic reactions and purification techniques are performed according to manufacturer's specifications or as commonly accomplished in the art or as described herein. The foregoing techniques and procedures are generally performed according to conventional methods well known in the art and as described in various general and more specific references that are cited and discussed throughout the present specification. The nomenclatures utilized in connection with, and the laboratory procedures and techniques of, analytical chemistry, synthetic organic chemistry, and medicinal and pharmaceutical chemistry described herein are those well-known and commonly used in the art.

All patents, published patent applications, and non-patent publications mentioned in the specification are indicative of the level of skill of those skilled in the art to which this presently disclosed and/or claimed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the compositions and/or methods disclosed and/or claimed herein can be made and executed without undue experimentation in light of the present disclosure. While the compositions and methods of this presently disclosed and/or claimed inventive concept(s) have been described in terms of preferred embodiments, it will be apparent to those of skill in the art that variations may be applied to the compositions and/or methods and in the steps or in the sequence of steps of the method described herein without departing from the concept, spirit and scope of the presently disclosed and/or claimed inventive concept(s). All such similar substitutes and modifications apparent to those skilled in the art are deemed to be within the spirit, scope and concept of the inventive concept(s) as defined by the appended claims.

As utilized in accordance with the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The singular forms "a," "an," and "the" include plural referents unless the context clearly indicates otherwise. Thus, for example, reference to "a compound" may refer to 1 or more, 2 or more, 3 or more, 4 or more, or greater numbers of compounds. The term "plurality" refers to "two or more." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. For example but not by way of limitation, when the term "about" is utilized, the designated value may vary by ±20%, or ±10%, or ±5%, or ±1%, or ±0.1% from the specified value, as such variations are appropriate to perform the disclosed methods and as understood by persons having ordinary skill in the art. The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z. The use of ordinal number terminology (i.e., "first", "second", "third", "fourth", etc.) is solely for the purpose of differentiating between two or more items and is not meant to imply any sequence or order or importance to one item over another or any order of addition, for example.

As used in this specification and claim(s), the terms "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

As used herein, the phrase "associated with" includes both direct association of two moieties to one another as well as indirect association of two moieties to one another. Non-limiting examples of associations include covalent binding of one moiety to another moiety either by a direct bond or through a spacer group, non-covalent binding of one moiety to another moiety either directly or by means of specific binding pair members bound to the moieties, incorporation of one moiety into another moiety such as by dissolving one moiety in another moiety or by synthesis, and coating one moiety on another moiety.

The term "purified" as used herein means at least one order of magnitude of purification is achieved compared to the starting material or of the natural material, for example but not by way of limitation, two, three, four, or five orders of magnitude of purification of the starting material or of the natural material. Thus, the term "purified" as utilized herein does not necessarily mean that the material is 100% purified, and therefore such term does not exclude the presence of other material(s) present in the purified composition.

The term "sample" as used herein will be understood to include any type of biological sample that may be utilized in accordance with the presently disclosed and/or claimed inventive concept(s). Examples of biological samples that may be utilized include, but are not limited to, whole blood or any portion thereof (i.e., plasma or serum), saliva, sputum, cerebrospinal fluid (CSF), skin, interstitial fluid, tears, mucus, urine, swabs, combinations, and the like. In one non-limiting embodiment, the sample is a volume of whole blood.

As previously mentioned, the current production process for ion-exchange resin membrane(s) for use in ISEs (such as, by way of example only, ISEs that detect chloride ions) requires the use of two separate dispensers—one which dispenses a predetermined amount (for instance, about 10 nanoliters) of a resin paste and another that dispenses a predetermined amount (for instance, about 10 nanoliters) of a hardener paste on a sensor substrate. The present manufacturing method suffers in that the two pastes (the resin paste and the hardener paste) cannot be pre-mixed to be used by a single dispenser because of the fast curing time (less than about five (5) minutes).

As presently described and/or claimed herein, it has been presently discovered that there are formulations for the creation of improved photo-curable, epoxy-based, ion-selective chloride sensor membrane(s) that requires only one dispenser for the fabrication of such membranes for use in chloride ISEs. Such new formulation(s) utilize at least one photocurable/photo-initiator compound that allows the formulation to be cured by a particular wavelength or spectrum(s) of light, such as, by way of example, UV-light (i.e., wavelengths from about 100 nanometers to about 400 nanometers).

It is to such reagents, as well as compositions/formulations, kits, and methods related thereto, that the presently disclosed and/or claimed inventive concept(s) is directed.

Turning now to embodiments of the presently disclosed and/or claimed inventive concept(s), new and improved reagents are provided that can be used with chloride sensors such that the chloride sensors exhibit increased stability and improved response kinetics over prior art sensor/reagent combinations. The reagents of the presently disclosed and/or claimed inventive concept(s) can be with potentiometric ISEs for ionized chloride, wherein the sensor/reagent combination exhibits improved response kinetics and recovery stability, as well as decreased production costs associated with the fabrication of such ISEs.

Epoxy resin has been identified as the next generation chloride sensing material(s) with improved selectivity and increased sensor stability and functional life. Generally, epoxide groups crosslink with polyamine and mercaptan to form a tridimensional high-density polymer network with amine and/or ammonium sites embedded in the polymer backbone. In particular, epoxide reacts with tertiary diamine and forms positively charged quaternary ammonium sites that are able to pair with chloride ions.

This reversible recognition is suitable to measure chloride ions that generate a potentiometric signal in an ISE sensor. In addition, the cross-linked polymer network creates a structural barrier that limits the diffusion of lipophilic species such as, for instance when the sample is whole blood, salicylate, heparin, and/or protein(s). Accordingly, epoxy-based chloride sensors provide improved selectivity in complex real sample detection.

In one non-limiting embodiment of the presently disclosed and/or claimed inventive concept(s), the mixture for forming the improved photo-curable, epoxy-based, ion-selective chloride sensor membrane(s) for use in chloride ISEs are comprised of at least one epoxy resin, at least one polymerization/curing agent, and at least one photo-curable/photo-initiator compound. These constituents may be pre-mixed and dispensed from the same dispenser onto an inert sensor substrate and subsequently photocured via the use of a particular wavelength and/or wavelengths of light, for instance, by way of example only, wavelength(s) of light within the ultraviolet (UV) spectrum.

In one non-limiting embodiment and as shown in FIG. 1, the improved membrane(s) may comprise or consist of predetermined amounts of at least one epoxy resin such as, by way of example, at least one liquid epoxy resin, such as D.E.R.™ 331 and/or D.E.R.™ 332 (bisphenol A diglycidylether) commercially offered for sale by Dow Chemical Company, at least one polymerization/curing agent, such as, by way of example, $N^1,N^1,N^6,N^6$-tetraallylhexane-1,6-diamine (BF1) and/or polypropylenimine tetramine dendrimer (DAB), and at least one photocurable/phot-initiator compound, such as, by way of example, 2,2-dimethoxy-2-phenylacetophenone (DMPA). FIG. 1 shows a non-limiting embodiment of reagents used to form the improved photo-curable, epoxy-based, ion-selective chloride sensor membrane(s) mixture of the presently disclosed and/or claimed inventive concept(s).

Figure 2:
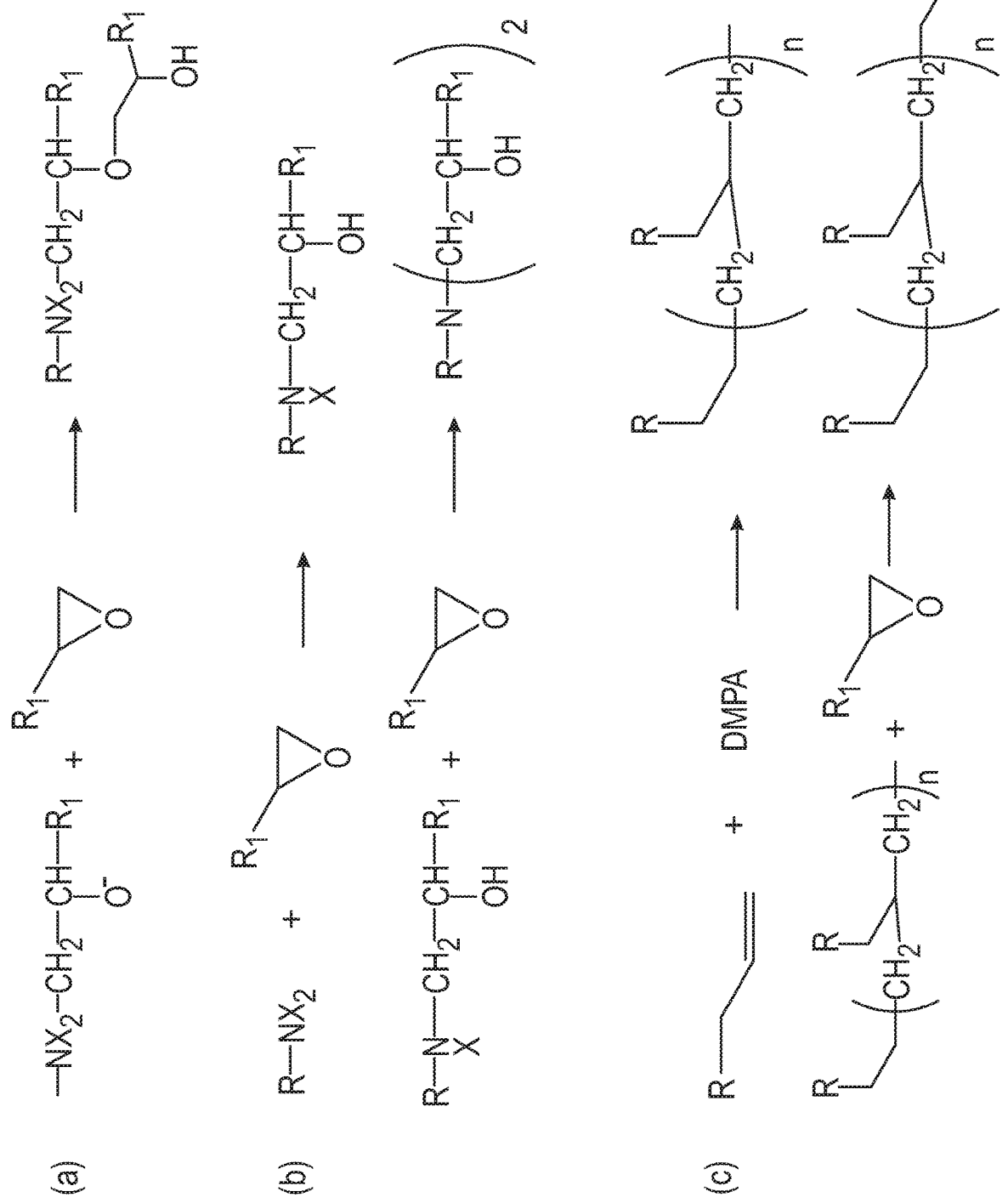
FIG. 2 illustrates a non-limiting embodiment of a reaction mechanism of an epoxy group with a (a) primary amine, (b) a tertiary amine, and (c) photo-initiation of BF1 with DMPA and the following radical polymerization between BF1 and an epoxy group for the formation of a chloride ion-selective membrane in accordance with the presently disclosed and/or claimed inventive concept(s).

The at least one polymerization agent (such as BF1 and/or DAB) provides tertiary diamines that form positively-charged quaternary ammonium sites that are able to pair with chloride ions. It has been discovered by the present inventive concept(s) that instead of conventional commercial epoxy hardener (i.e., mercaptan), diamines (such as BF1 and DAB) combined with DMPA create a highly selective chloride sensor with stable long-term use life that be useful for clinical analysis. FIG. 2 shows a non-limiting embodiment of a reaction mechanism for the formation of a photo-curable, epoxy-based, ion-selective chloride sensor membrane(S) in accordance with the presently disclosed and/or claimed inventive concept(s). As shown in FIG. 2, a reaction mechanism is shown for the polymerization of an epoxy group with (a) a primary amine (X=H), (b) a tertiary amine (X=alkyl group), while (c) shows a reaction mechanism of photo-initiation of diamine BF1 by photo-initiator DMPA and the following radical polymerization between BF1 and an epoxy group.

Another embodiment of the presently disclosed and/or claimed inventive concept(s) is directed to a method of manufacturing photo-curable, epoxy-based, ion-selective chloride sensor(s) that utilize chloride ion-exchange membrane(s) constructed in accordance with the present invention. In the method, an inert substrate is contacted with a mixture comprising one or more of the reagents described or otherwise contemplated herein above thereby forming a photo-curable, epoxy-based, ion-selective chloride sensor comprising a polymer layer, an electrode layer, a conductor layer, and/or a transducer layer. In one particular embodiment, an inert sensor substrate is contacted with a mixture of at least one epoxy resin, at least one polymerization/curing agent, and at least one photocurable compound. In one particular embodiment, the at least one epoxy resin comprises and/or consists of D.E.R.™ 331 and/or D.E.R.™ 332. The at least one polymerization/curing agent comprises and/or consists of BF1 and/or DAB, and the at least one photocurable compound is DMPA.

EXAMPLES

Examples are provided hereinbelow. However, the presently disclosed and/or claimed inventive concept(s) is to be understood to not be limited in its application to the specific experimentation, results, and laboratory procedures disclosed herein below. Rather, the Examples are simply provided as various embodiments and is meant to be exemplary, not exhaustive.

Example 1

Calculation of the Stochiometric Ratio by Epoxy Equivalent Weight (EEW) to Amine Hydrogen Equivalent Weight (AHEW) of Curing Agent Using Parts Per Hundred (PPH)

EEW, AHEW, and PPH are values that are helpful in calculating the stoichiometric ratio(s) necessary for the presently disclosed and/or claimed inventive concept(s). The EEW of commercially available epoxy resins can be obtained from their product information—for instance, the average EEW for D.E.R.™ 331 is 187 grams per equivalent. AHEW of the polymerization/curing agent blend (BF1 and DAB) is calculated using the number of each compound's amine hydrogens and molecular weights. PPH is calculated using the EEW and AHEW of the polymerization/curing agent blend. Accordingly, the calculation of AHEW(s) and PPH can be calculated in accordance with the following three (3) formulae:

$$AHEW \text{ of Curing Agent} = \frac{\text{Molecular Weight of Curing Agent}}{\text{\# of Amine Hydrogens}} \quad \text{(I)}$$

$$AHEW \text{ of Curing Agent Blend } A \text{ and } B = \quad \text{(II)}$$
$$\frac{\text{Total Weight of Curing Agent Blend}}{\frac{\text{Weight } A}{AHEW_A} + \frac{\text{Weight } B}{AHEW_B}}$$

$$PPH = \frac{AHEW \text{ of Curing Agent Blend}}{EEW \text{ of Epoxy Resin}} \times 100 \quad \text{(III)}$$

Based on the polymerization/curing agents detailed hereinabove (BF1 and DAB), the AHEW of BF1, DAB and the polymerization/curing agent blend are 138 grams per equivalent, 32 grams per equivalent, and 117 grams per equivalent, respectively. Given that the EEW of D.E.R.™ 331 is 187 grams per equivalent, the PPH is calculated to be 62. Accordingly, 62 parts of curing agent blend per 100 parts of D.E.R.™ 331 is needed to accomplish the presently disclosed and/or claimed inventive concept(s), including, without limitation, the creation of a photocurable, epoxy-based, ion-selective chloride sensor membrane(s).

Example 2

Preparation of Photo-Curable Epoxy-Based Ion-Selective Chloride Sensor Membrane Mixture In this non-limiting embodiment, 1,250 milligrams of D.E.R.™ 331, 851 microliters of BF1, 41.7 milligrams of DAB, and 60.5 milligrams of DMPA were mixed in a 3-milliliter plastic amber tube. After the mixture was mixed using a mixer commercially offered for sale by SPEX® SamplePrep for 20±2 minutes such that the mixture was in a substantially homogenous state, the mixture was stored in a freezer at −70° C. before the mixture was dispensed onto an inert electrode substrate. The stoichiometric ratio of 8:2 (BF1:DAB) for the polymerization/curing agent blend was used to prepare the final mixture.

Example 3

Preparation of Photo-Curable Epoxy-Based Ion-Selective Chloride Sensor 0.5 microliter of the chloride sensor membrane mixture prepared in Example 2 hereinabove was dispensed on an inert substrate comprising a polymer layer (comprising the mixture from Example 2), an electrode layer, a conductor layer, and/or a transducer layer. Following being dispensed (from a single dispenser) on the substrate, the membrane mixture was irradiated with UV light for about 10 minutes thereby forming the photocured, epoxy-based, ion-selective chloride sensor. The sensor was then placed in an oven at 100° C. for about 10 minutes. The sensor was then cured in an oven at about 40° C. for 72 hours before performance testing was commenced.

Example 4

Performance of Photo-Curable, Epoxy-Based, Ion-Selective Chloride Sensor

Figure 3:
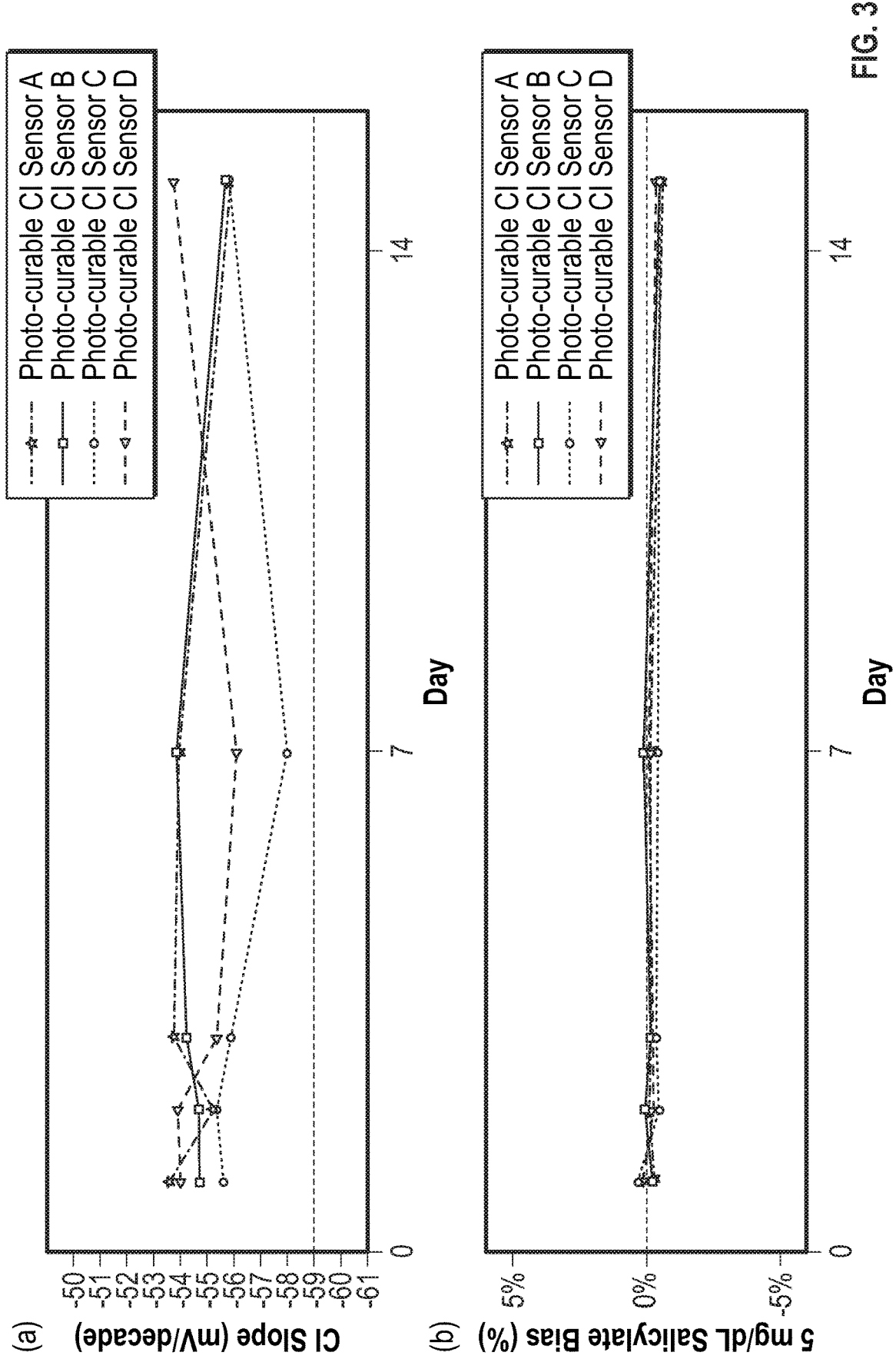
FIG. 3 is a graphical representation of the stability of (a) chloride sensitivity and (b) salicylate bias exhibited by a photo-curable, epoxy-based, ion-selective chloride sensor(s) constructed in accordance with the presently disclosed and/or claimed inventive concept(s).

In this particular non-limiting example, a total of four (4) photo-curable, epoxy-based, ion-selective chloride sensors were bench-tested utilizing a potentiostat (in this particular case, a potentiostat offered for commercial sale by Lawson Labs, Inc.). As shown in FIG. 3, both the stability of chloride sensitivity and the salicylate bias were measured for each sensor over a period of fifteen (15) days. When the sensors were not being tested during this fifteen (15) day period, the sensors were stored in a phosphate buffer solution comprising 10 mM sodium chloride, 0.4 mM potassium chloride, 4.0 mM sodium bicarbonate, 0.01% bovine serum albumin, and other preservatives commonly known in the art. In order to be clinically applicable, each sensor preferably yields a slope for chloride sensitivity within a range of from about −40 to about −60 mV/decade. As can be seen from FIG. 3, each of the sensors tested fall within this clinically applicable range for chloride sensitivity. In addition, as shown in FIG. 3, the salicylate bias resulting from 5 mg/dL salicylate collectively for the four (4) sensors tested is less than about 0.25% over the fifteen (15) day period (indicating that the current sensor membranes are effective in mitigating/eliminating unwanted compounds, such as salicylate, from passing into the sensor).

Example 5

Chloride Sensitivity and Salicylate Bias Comparison of Commercially-Available Chloride Sensors and Photo-Curable Ion-Selective Chloride Sensors of the Presently Disclosed and/or Claimed Inventive Concept(s)

Figure 4:
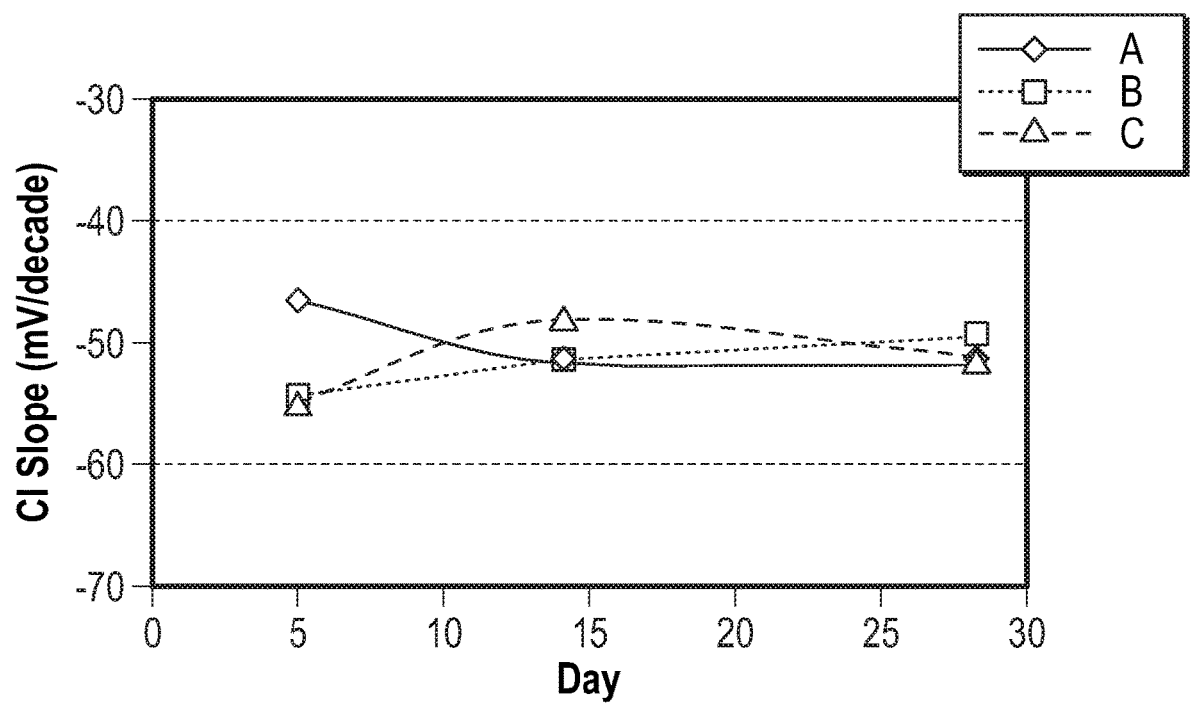
FIG. 4 is a graphical representation of the stability of chloride sensitivity over a period of 28 days for three (3) commercially-available chloride sensors.
Figure 5:
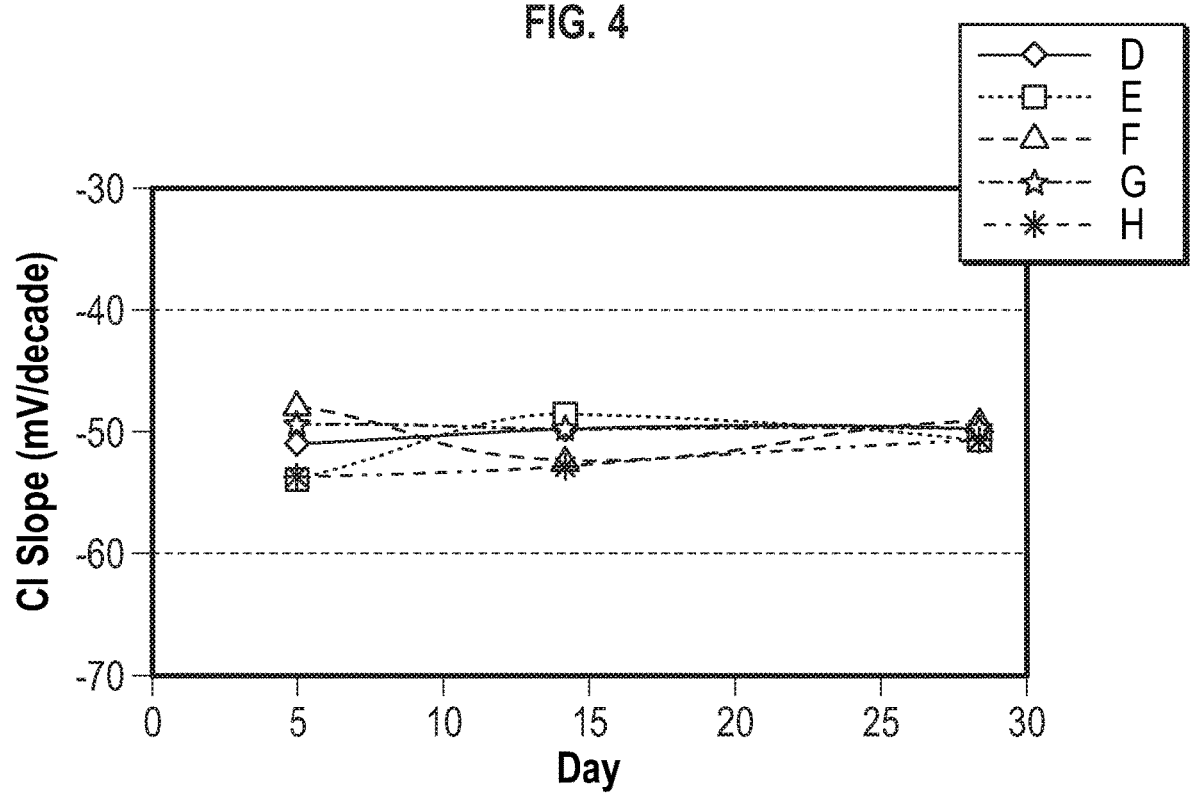
FIG. 5 is a graphical representation of the stability of chloride sensitivity over a period of 28 days for five (5) photo-curable, ion-selective, chloride sensors constructed in accordance with the presently disclosed and/or claimed inventive concept(s).

FIG. 4 shows the stability of chloride sensitivity over a period of 28 days for three (3) commercially-available chloride sensors, while FIG. 5 shows the stability of chloride sensitivity over the same 28 day-period for five (5) photo-curable, epoxy-based, ion-selective chloride sensors constructed in accordance with the presently disclosed and/or claimed inventive concept(s). For the 28 day-period, each of the sensors (both commercially available sensors and the improved photo-curable, epoxy-based, ion-selective chloride sensors of the presently disclosed and/or claimed inventive concept(s)) were stored in a phosphate buffer solution comprising 10 mM sodium chloride, 0.4 mM potassium chloride, 4.0 mM sodium bicarbonate, 0.01% bovine serum albumin, and other preservatives commonly known in the art. In order to be clinically applicable, each sensor preferably yields a slope for chloride sensitivity within a range of from about −40 to about −60 mV/decade.

As can be seen in FIG. 4 and FIG. 5, the photo-curable, epoxy-based, ion-selective chloride sensors constructed in accordance with the presently disclosed and/or claimed inventive concept(s) fall within this range over the 28-day period and these sensors are at least as stable (if not more stable) to chloride sensitivity as the commercially-available chloride sensors shown in FIG. 4. The salicylate bias for the commercially-available chloride sensors and the photo-curable, epoxy-based, ion-selective chloride sensors constructed in accordance with the presently disclosed and/or claimed inventive concept(s) are shown below in Table 1. As shown in Table 1, the salicylate bias of the commercially-available chloride sensors and the photo-curable, epoxy-based, ion-selective chloride sensor(s) of the presently disclosed and/or claimed inventive concept(s) are less than about 5.6±0.2% and 3.3±2.0, respectively. This shows that the salicylate bias of the photo-curable, epoxy-based, ion-selective chloride sensors of the presently disclosed and/or claimed inventive concept(s) is as effective, if not more effective, at mitigating the transfer of salicylate through the membrane to the sensor as the commercially-available chloride sensors.

TABLE 1

Salicylate Bias Exhibited by Commercially-Available Chloride Sensors and Photo-Curable Ion-Selective Chloride Sensors Over a 28 Day-Period

|  | n | Day 5 (%) | Day 14 (%) | Day 28 (%) |
|---|---|---|---|---|
| Commercially-Available Sensors | 3 | 1.3 ± 0.0 | 0.1 ± 0.0 | 5.6 ± 0.2 |
| Photo-Curable Ion-Selective Chloride Sensors | 5 | 0.8 ± 0.1 | 0.5 ± 0.2 | 3.3 ± 2.0 |

Non-Limiting Examples of the Inventive Concept(s)

The following is a numbered list of non-limiting, illustrative embodiments of the inventive concepts disclosed herein:

A photocurable, epoxy-based, ion-selective chloride sensor membrane mixture, comprising: at least one epoxy resin; at least one curing agent; and at least one photocurable compound.

The mixture, wherein the at least one epoxy resin is at least one liquid epoxy resin.

The mixture, wherein at least one liquid epoxy resin is selected from the group consisting of D.E.R.™ 331, bisphenol A diglycidylether, and combinations thereof.

The mixture, wherein the at least one curing agent is selected from the group consisting of $N^1,N^1, N^6,N^6$-tetraallylhexane-1,6-diamine, polypropylenimine tetramine dendrimer, and combinations thereof.

The mixture, wherein the at least one photocurable compound is 2,2-dimethoxy-2-phenylacetophenone.

A photo-curable, epoxy-based, ion-selective chloride sensor, comprising: a polymer layer; an electrode layer; a conductor layer; and a transducer layer, wherein the polymer layer comprises a photocured mixture comprising at least one epoxy resin, at least one curing agent, and at least one photocurable compound.

The sensor, wherein the at least one epoxy resin is at least one liquid epoxy resin.

The sensor, wherein at least one liquid epoxy resin is selected from the group consisting of D.E.R.™ 331, bisphenol A diglycidylether, and combinations thereof.

The sensor, wherein the at least one curing agent is selected from the group consisting of $N^1,N^1, N^6,N^6$-tetraallylhexane-1,6-diamine, polypropylenimine tetramine dendrimer, and combinations thereof.

The sensor, wherein the at least one photocurable compound is 2,2-dimethoxy-2-phenylacetophenone.

The sensor, wherein the mixture is photocured via at least one wavelength of light within the ultraviolet spectrum.

A method of fabricating a photo-curable, epoxy-based, ion-selective chloride sensor, the method comprising the steps of: mixing effective amounts of at least one epoxy resin, at least one curing agent, and at least one photocurable compound to form a photo-curable polymer mixture, wherein the photo-curable polymer mixture is contained within a single dispenser; dispensing an effective amount of the photo-curable polymer mixture onto a surface of an inert ion-selective electrode substrate, the inert ion-selective electrode substrate comprising an electrode layer, a conductor layer, and a transducer layer, wherein the photo-curable polymer mixture is dispensed on the electrode layer of the inert-selective electrode substrate; and irradiating the photo-curable polymer mixture with at least one wavelength of light to thereby form a photo-curable, epoxy-based, ion-selective chloride sensor.

The method, wherein the at least one epoxy resin is at least one liquid epoxy resin.

The method, wherein at least one liquid epoxy resin is selected from the group consisting of D.E.R.™ 331, bisphenol A diglycidylether, and combinations thereof.

The method, wherein the at least one curing agent is selected from the group consisting of $N^1,N^1, N^6,N^6$-tetraallylhexane-1,6-diamine, polypropylenimine tetramine dendrimer, and combinations thereof.

The method, wherein the at least one photocurable compound is 2,2-dimethoxy-2-phenylacetophenone.

The method, wherein the at least one wavelength of light is within the ultraviolet spectrum.

Therefore, in accordance with the presently disclosed and/or claimed inventive concept(s), there have been provided reagents, as well as kits containing same and methods of use thereof, that fully satisfy the objectives and advantages set forth hereinabove. Although the presently disclosed and/or claimed inventive concept(s) has been described in conjunction with the specific drawings, experimentation, results, and language set forth herein above, it is evident that many alternatives, modifications, and variations will be apparent to those of ordinary skill in the art. Accordingly, it is intended to embrace all such alternatives, modifications, and variations that fall within the spirit and broad scope of the presently disclosed and/or claimed inventive concept(s).

What is claimed is:

1. A method of fabricating a photo-curable, epoxy-based, ion-selective chloride sensor, the method comprising the steps of:
   mixing amounts of at least one epoxy resin, at least one amine-containing curing agent, and at least one photo-curable compound to form a photo-curable polymer mixture, wherein the photo-curable polymer mixture is contained within a single dispenser, wherein the at least one amine-containing curing agent comprises $N^1,N^1, N^6,N^6$-tetraallylhexane-1,6-diamine (BF1) and polypropylenimine tetramine dendrimer (DAB), and wherein the at least one photocurable compound comprises 2,2-dimethoxy-2-phenylacetophenone (DMPPA);
   dispensing an amount of the photo-curable polymer mixture onto a surface of an inert ion-selective electrode substrate, the inert ion-selective electrode substrate comprising an electrode layer, a conductor layer, and a transducer layer, wherein the photo-curable polymer mixture is dispensed on the electrode layer of the inert-selective electrode substrate; and
   irradiating the photo-curable polymer mixture with at least one wavelength of light thereby form the photo-curable, epoxy-based, ion-selective chloride sensor.

2. The method of claim 1, wherein the at least one epoxy resin is at least one liquid epoxy resin.

3. The method of claim 2, wherein the at least one liquid epoxy resin is bisphenol A diglycidylether.

4. The method of claim 1, wherein the at least one wavelength of light is within the ultraviolet spectrum.

5. The method of claim 1, wherein a stoichiometric ratio of BF1:DAB is 8:2.

6. The method of claim 1, wherein the photo-curable, epoxy-based, ion-selective chloride sensor is prepared in the absence of a mercaptan.

7. A method of fabricating a photo-curable, epoxy-based, ion-selective chloride sensor, the method comprising the steps of:

mixing amounts of at least one epoxy resin, $N^1,N^1,N^6,N^6$-tetraallylhexane-1,6-diamine (BF1), polypropylenimine tetramine dendrimer (DAB), and 2,2-dimethoxy-2-phenylacetophenone (DMPA) to form a photo-curable polymer mixture, wherein the photo-curable polymer mixture is contained within a single dispenser;

dispensing an amount of the photo-curable polymer mixture onto a surface of an inert ion-selective electrode substrate, the inert ion-selective electrode substrate comprising an electrode layer, a conductor layer, and a transducer layer, wherein the photo-curable polymer mixture is dispensed on the electrode layer of the inert-selective electrode substrate; and irradiating the photo-curable polymer mixture with at least one wavelength of light to thereby form the photo-curable, epoxy-based, ion-selective chloride sensor.

8. The method of claim 7, wherein the at least one epoxy resin is at least one liquid epoxy resin.

9. The method of claim 8, wherein the at least one liquid epoxy resin is bisphenol A diglycidylether.

10. The method of claim 7, wherein the at least one wavelength of light is within the ultraviolet spectrum.

11. The method of claim 7, wherein a stoichiometric ratio of BF1:DAB is 8:2.

12. The method of claim 7, wherein the photo-curable, epoxy-based, ion-selective chloride sensor is prepared in the absence of a mercaptan.

13. A method of fabricating a photo-curable, epoxy-based, ion-selective chloride sensor, the method comprising the steps of:

mixing amounts of bisphenol A diglycidylether, $N^1,N^1,N^6,N^6$-tetraallylhexane1,6-diamine (BF1), polypropylenimine tetramine dendrimer (DAB), and 2,2-dimethoxy-2-phenylacetophenone (DMPA) to form a photo-curable polymer mixture, wherein the photo-curable polymer mixture is contained within a single dispenser, and wherein the BF1 and the DAB are present at a BF1:DAB stoichiometric ratio of 8:2;

dispensing an amount of the photo-curable polymer mixture onto a surface of an inert ion-selective electrode substrate, the inert ion-selective electrode substrate comprising an electrode layer, a conductor layer, and a transducer layer, wherein the photo-curable polymer mixture is dispensed on the electrode layer of the inert-selective electrode substrate; and irradiating the photo-curable polymer mixture with at least one wavelength of light within the ultraviolet spectrum to thereby form the photo-curable, epoxy-based, ion-selective chloride sensor.

14. The method of claim 13, wherein the photo-curable, epoxy-based, ion-selective chloride sensor is prepared in the absence of a mercaptan.

* * * * *